(12) United States Patent
Noda et al.

(10) Patent No.: US 9,255,382 B2
(45) Date of Patent: Feb. 9, 2016

(54) CONSTRUCTION MACHINE

(71) Applicant: KOBELCO CONSTRUCTION MACHINERY CO., LTD., Hiroshima-shi (JP)

(72) Inventors: Tsuyoshi Noda, Hiroshima (JP); Masakazu Ozaki, Hiroshima (JP)

(73) Assignee: KOBELCO CONSTRUCTION MACHINERY CO., LTD., Hiroshima-shi (JP)

( * ) Notice: Subject to any disclaimer, the term of this patent is extended or adjusted under 35 U.S.C. 154(b) by 0 days.

(21) Appl. No.: 14/571,465

(22) Filed: Dec. 16, 2014

(65) Prior Publication Data

US 2015/0204051 A1 Jul. 23, 2015

(30) Foreign Application Priority Data

Jan. 17, 2014 (JP) ................. 2014-006499

(51) Int. Cl.
*E02F 9/08* (2006.01)
*B25H 5/00* (2006.01)
(Continued)

(52) U.S. Cl.
CPC ............... *E02F 9/0883* (2013.01); *B25H 5/00* (2013.01); *E02F 9/00* (2013.01); *E02F 9/0833* (2013.01); *E02F 9/16* (2013.01); *F01N 3/2066* (2013.01); *F01N 13/002* (2013.01); *F01N 2590/08* (2013.01); *F01N 2610/02* (2013.01); *F01N 2610/1406* (2013.01); *F01N 2610/1413* (2013.01)

(58) Field of Classification Search
CPC ......... E02F 9/0883; E02F 9/16; E02F 9/0833; F01N 13/002
See application file for complete search history.

(56) References Cited

U.S. PATENT DOCUMENTS 7,780,213 B2 * 8/2010 Kim ............................. 296/37.6
7,988,167 B2 * 8/2011 Sakitani et al. ............... 280/163
(Continued)

FOREIGN PATENT DOCUMENTS

EP   2 218 834 A2   8/2010
EP   2 218 834 A3   8/2010
(Continued)

OTHER PUBLICATIONS

Extended European Search Report issued Sep. 8, 2015 in Patent Application No. 14199969.8.
(Continued)

*Primary Examiner* — Nicole Verley
(74) *Attorney, Agent, or Firm* — Oblon, McClelland, Maier & Neustadt, L.L.P.

(57) ABSTRACT

Provided is a construction machine having a sufficient space for tool accommodation and allowing reducing agent to be supplied into a reducing-agent tank easily. The construction machine includes an engine, a reducing-agent tank having a tank body and a supply portion, and a tool box. The tool box includes a box body defining an accommodation space having an opening which opens the accommodation space outwards and allows a tool to be put into and taken from the accommodation space through the opening, and an opening/closing cover which opens and closes the opening. The tank body is outside the box body. The supply portion includes a basal end connected to the tank body and a distal end located in the accommodation space at a position making the distal end visible from the outside of the box body through the opening which is opened.

9 Claims, 7 Drawing Sheets

(51) Int. Cl.
  *E02F 9/00* (2006.01)
  *E02F 9/16* (2006.01)
  *F01N 3/20* (2006.01)
  *F01N 13/00* (2010.01)

(56) References Cited

U.S. PATENT DOCUMENTS

| | | | |
|---|---|---|---|
| 8,177,387 B2 * | 5/2012 | Noda et al. | 362/154 |
| 8,186,156 B2 * | 5/2012 | Kamiya et al. | 60/420 |
| 8,661,793 B2 * | 3/2014 | Yamashita et al. | 60/295 |
| 8,708,087 B2 * | 4/2014 | Kashu et al. | 180/296 |
| 8,973,692 B1 * | 3/2015 | Okuda et al. | 180/68.5 |
| 9,027,688 B2 * | 5/2015 | Okuda et al. | 180/89.2 |
| 9,027,697 B2 * | 5/2015 | Kobayashi et al. | 180/309 |
| 2010/0206927 A1 * | 8/2010 | Noda et al. | 224/401 |
| 2012/0067660 A1 * | 3/2012 | Kashu et al. | 180/296 |
| 2015/0016932 A1 * | 1/2015 | Azuma et al. | 414/687 |

FOREIGN PATENT DOCUMENTS

| | | |
|---|---|---|
| EP | 2 431 536 A1 | 3/2012 |
| EP | 2 474 672 A1 | 7/2012 |
| JP | 11-22574 A | 1/1999 |
| JP | 2010-236207 A | 10/2010 |
| JP | 2011-12661 | 1/2011 |
| WO | WO 2012073872 A1 * | 6/2012 |
| WO | WO 2013/137169 A1 | 9/2013 |
| WO | WO 2013179696 A1 * | 12/2013 |
| WO | WO 2015053273 A1 * | 4/2015 |

OTHER PUBLICATIONS

Partial European Search Report issued May 19, 2015 in Patent Application No. 14199969.8.

* cited by examiner

CONSTRUCTION MACHINE

BACKGROUND OF THE INVENTION

1. Field of the Invention

The present invention relates to a construction machine.

2. Description of the Background Art

In recent years, there has been developed a construction machine loaded with an SCR (Selective Catalytic Reduction) system in order to reduce NOx contained in exhaust gas. Specifically, there is known a construction machine provided with a reducing-agent tank for accommodating reducing agent such as urea water. In the construction machine, the reducing agent is added to exhaust gas for promoting reduction of NOx in the exhaust gas.

Japanese Unexamined Patent Publication No. 2011-012661 (Patent Literature 1) discloses a construction machine provided with an upper slewing body, on which a reducing-agent tank is loaded. The construction machine is further provided with a tool box for facilitating a supply operation of reducing agent into the reducing-agent tank from outside of the upper slewing body or maintenance of the reducing-agent tank. The tool box has an openable/closable cover member. The tool box is disposed on an outer portion of the upper slewing body to house the reducing-agent tank therein.

International Unexamined Patent Publication No. 2013/137169 (Patent Literature 2) discloses a construction machine provided with a first accommodation case defining an article accommodation space and a second accommodation case housing a reducing-agent tank therein.

The construction machine disclosed in Patent Literature 1, involving the requirement of the tool box to accommodate the reducing-agent tank in addition to a tool to be accommodated, permits the tool box to have only a reduced space for accommodating the tool box by the capacity of the reducing-agent tank. Besides, the tool in the tool box can exert an impact on a tank body of the reducing-agent tank, the tank body thus being likely to be damaged by the impact because it is made of a resin material for prevention of the tank body from rust due to urea.

On the other hand, the construction machine disclosed in Patent Literature 2, having both of the first and second accommodation cases, involves increase in the number of parts and cost. Furthermore, the entire construction machine has to be large-sized in order to secure an accommodation space for both of the two accommodation cases. The accommodation space may be reduced by vertical arrangement of the tanks; however, such vertical arrangement hinders an operator from easily accessing the case disposed at upper side from the ground, thus making a maintenance operation therefor difficult.

SUMMARY OF THE INVENTION

An object of the invention is to provide a construction machine including a reducing-agent tank, the construction machine allowing an operator to supply reducing agent into the reducing-agent tank easily, while securing a sufficient space for accommodating a tool.

Provided is a construction machine including an engine; a reducing-agent tank having a tank body for storing reducing agent to reduce exhaust gas from the engine and a supply portion which is connected to the tank body to allow the reducing agent to be supplied in the tank body through the supply portion; and a tool box for accommodating a tool. The tool box includes a box body internally defining an accommodation space having an opening which allows the accommodation space to be opened outwards of the box body and allows the tool to be put into and taken from the accommodation space through the opening, and an opening/closing cover which opens and closes the opening. The tank body is disposed outside the box body. The supply portion includes a basal end connected to the tank body and a distal end opposite to the basal end, the distal end located at a position in the accommodation space, the position making the distal end visible from the outside of the box body through the opening which is opened.

These and other objects, features and advantages of the present invention will become more apparent upon reading the following detailed description along with the accompanying drawings.

DESCRIPTION OF THE PREFERRED EMBODIMENT

There will be described below an embodiment of the present invention based on the drawings. It should be noted that the following description of a preferred embodiment is merely an example in nature and is not intended to limit the present invention, its application, or its use. The directions such as up, down, front, rear, left, and right are indicated by respective arrows in each drawing. Unless otherwise particularly specified, upward, downward and other directions are described in accordance with the directions indicated by the arrows.

Figure 1:
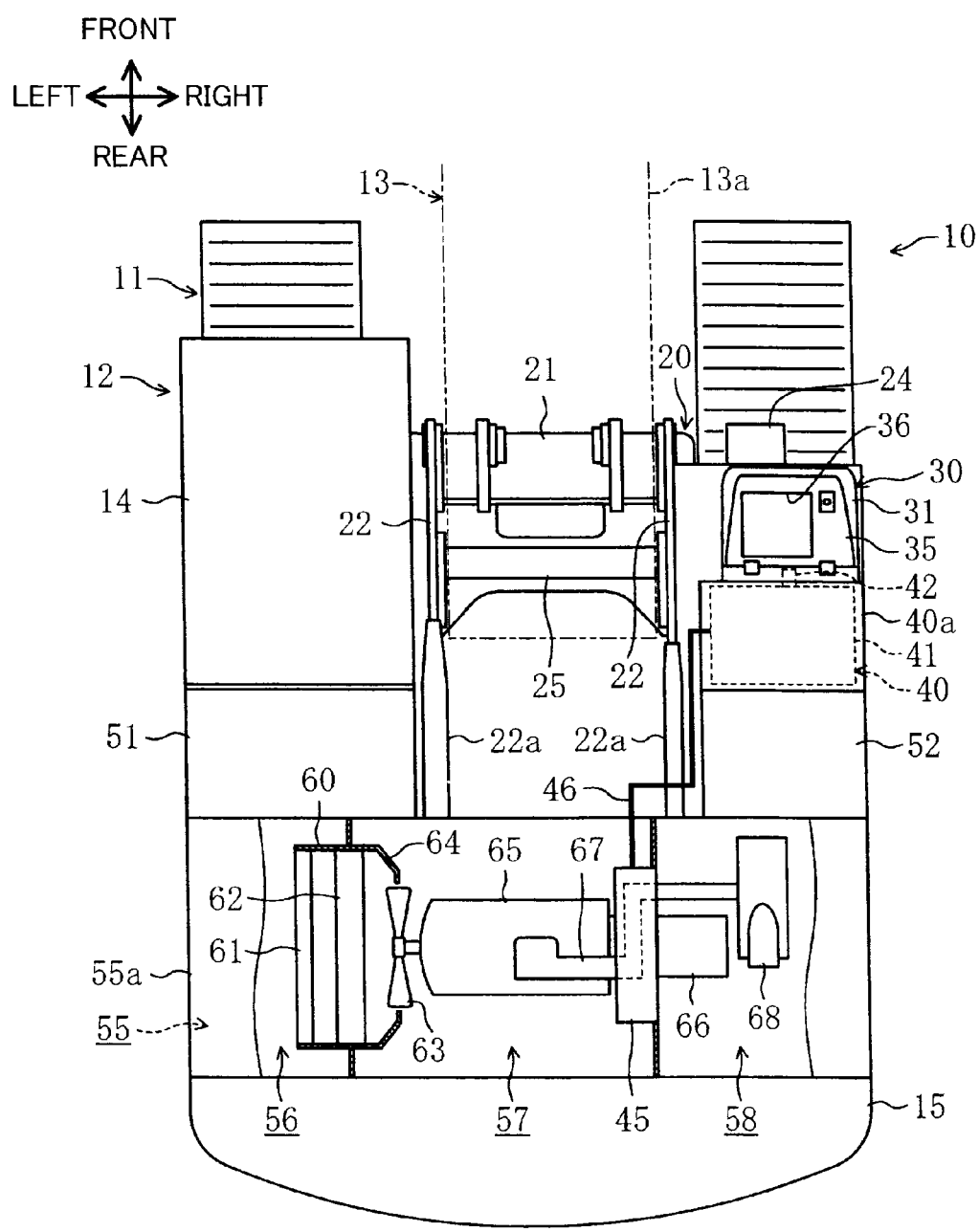
FIG. 1 is a plan view of a construction machine embodying the invention.
Figure 2:
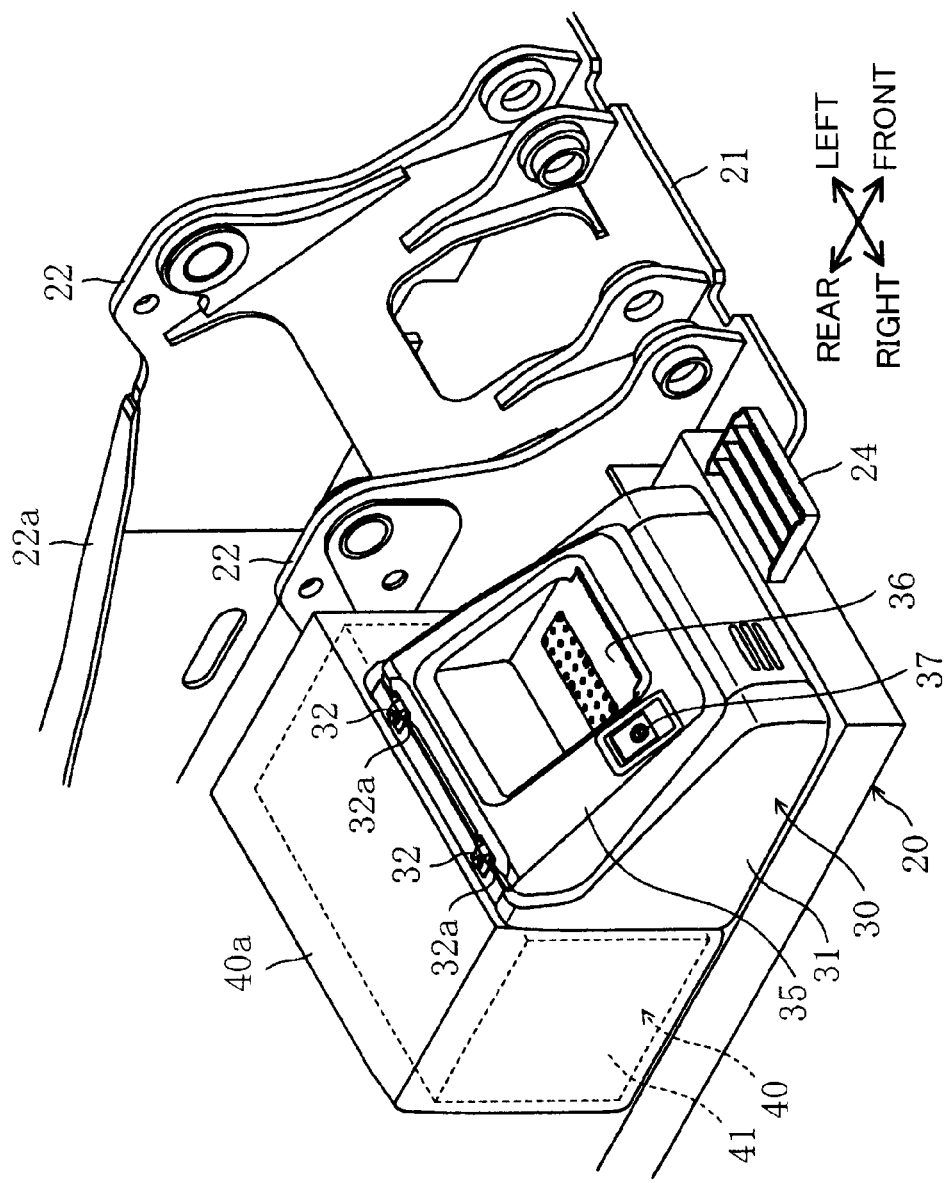
FIG. 2 is a perspective view showing a tool box provided in the construction machine in a state where an opening/closing cover closes an opening of a box body.

FIG. 1 is a plan view showing a construction machine 10 according to the embodiment. The construction machine 10 is a hydraulic excavator including a crawler-type lower traveling body 11 and an upper slewing body 12 loaded thereon. The upper slewing body 12 includes an upper frame 20. The construction machine 10 further includes an attachment 13, a cab 14, a counterweight 15, a tool box 30, a reducing-agent tank 40, a fuel tank 51, a hydraulic-fluid tank 52, and a machine room 55, which are loaded on the upper frame 20.

The upper frame 20 includes a bottom plate 21 and a pair of right and left vertical plates 22 disposed on an intermediate portion of the bottom plate 21 with respect to right and left directions or a width direction of the bottom plate 21. Each of the vertical plates 22 includes a body plate standing up while extending in front and rear directions of the bottom plate 21 and a band-shaped reinforcing plate 22a joined to the body plate at the upper end of the rear part of the body plate, thus having a substantially T-shaped cross section.

The pair of vertical plates 22 have respective front portions, which support a boom foot pin 25 extending in right and left directions of the upper frame 20. The attachment 13 includes a boom 13a and an arm, the boom 13a including a basal end supported pivotally about the boom foot pin 25.

The cab 14 is disposed at a front and left part of the upper slewing body 12. The cab 14 defines an operation space for the operator, in which space a driver's seat, various operation devices, and metering instruments are equipped. The fuel tank 51 is disposed rearward of the cab 14 to store fuel for driving the engine of the construction machine 10.

The tool box 30, the reducing-agent tank 40, and the hydraulic-fluid tank 52 are disposed on the slewing body 12 at a front part on the right side of the upper slewing body 12 in this order from the front side. The hydraulic-fluid tank 52 stores hydraulic fluid for hydraulic control. The upper frame 20 is provided with a platform 24, which is located on the front side of the tool box 30 with respect to front and rear directions of the upper slewing body 12. The tool box 30 and the reducing-agent tank 40 have respective configurations which will be specifically described later.

The machine room 55 is disposed on the upper slew body 12 at the rear part thereof. Specifically, the machine room 55 is disposed across the entire region of the rear part in right and left directions. The machine room 55 is covered with a machine-room cover 55a located at an upper side of the machine room 55. The machine room 55 is separated into an air intake chamber 56, an engine chamber 57, and a pump chamber 58 by a plurality of partition walls, wherein the air intake chamber 56, the engine chamber 57, and the pump chamber 58 are aligned in this order from the left side. The machine room 55 accommodates an engine 65, a radiator 62, a hydraulic pump 66, an air intake duct 60, an exhaust pipe 67, a muffler 68, a cooling fan 63 and others.

The air intake duct 60 is disposed in the air intake chamber 56. The air intake duct 60 is attached with a filter 61 for dustproof. The filter 61 is disposed on an upstream portion of the air intake duct 60 in the air flow direction. The radiator 62 is mounted on the partition wall between the air intake chamber 56 and the engine chamber 57.

The engine 65 and the hydraulic pump 66 are installed in the engine chamber 57 and in the pump chamber 58, respectively. The exhaust pipe 67 is connected to the engine 65, extending across the engine chamber 57 and the pump chamber 58. The muffler 68 is provided to a distal end of the exhaust pipe 67 in the pump chamber 58. Exhaust gas emitted from the engine 65 is released to the outside of the machine room 55 through the exhaust pipe 67 and through the muffler 68.

The fan 63 is disposed in the engine chamber 57 and located near the radiator 62. The fan 63 is rotationally driven by the engine 65. The fan 63 is covered with a fan shroud 64, which is disposed around the covering the fan 63 and joined to the air intake duct 60.

As shown in FIG. 2 to FIG. 5, the tool box 30 includes a box body 31 and an opening/closing cover 35.

The box body 31 internally defines an accommodation space S corresponding to the inner space of the box body 31. The accommodation space S has an opening 31a, which is oriented so as to make a direction normal to the plane including the opening 31a be obliquely upward. In other words, the opening 31a opens the accommodation space S obliquely upward, thereby allowing a tool to be put into and taken from the accommodation space S through the opening 31a.

The opening/closing cover 35 is connected to the box body 31 via hinges 32 so as to open and close the opening 31a. Specifically, the box body 31 has a rear wall, while the opening/closing cover 35 includes an upper edge portion and a lower edge portion opposite to the upper edge portion, the hinges 32 interconnecting an upper end of the rear wall and an edge portion of the opening/closing cover 35 corresponding thereto, specifically, the upper edge portion of the opening/closing cover 35 in the embodiment. The hinges 32 include respective shafts 32a extending in right and left directions and allow the opening/closing cover 35 to make pivotal movement about a pivot axis, which is an axis of the pivot shafts 32a, relatively to the box body 31. The pivotal movement allows the opening/closing cover 35 to be moved between a close position in which the opening/closing cover 35 closes the opening 31a in an oblique posture, specifically, in a posture with inclination toward the front side of the upper slewing body 12 in the embodiment, and an open position in which the lower edge portion of the opening/closing cover 35 is apart from the box body 31 upward in the direction of the pivotal movement to thereby open the opening 31a.

Figure 3:
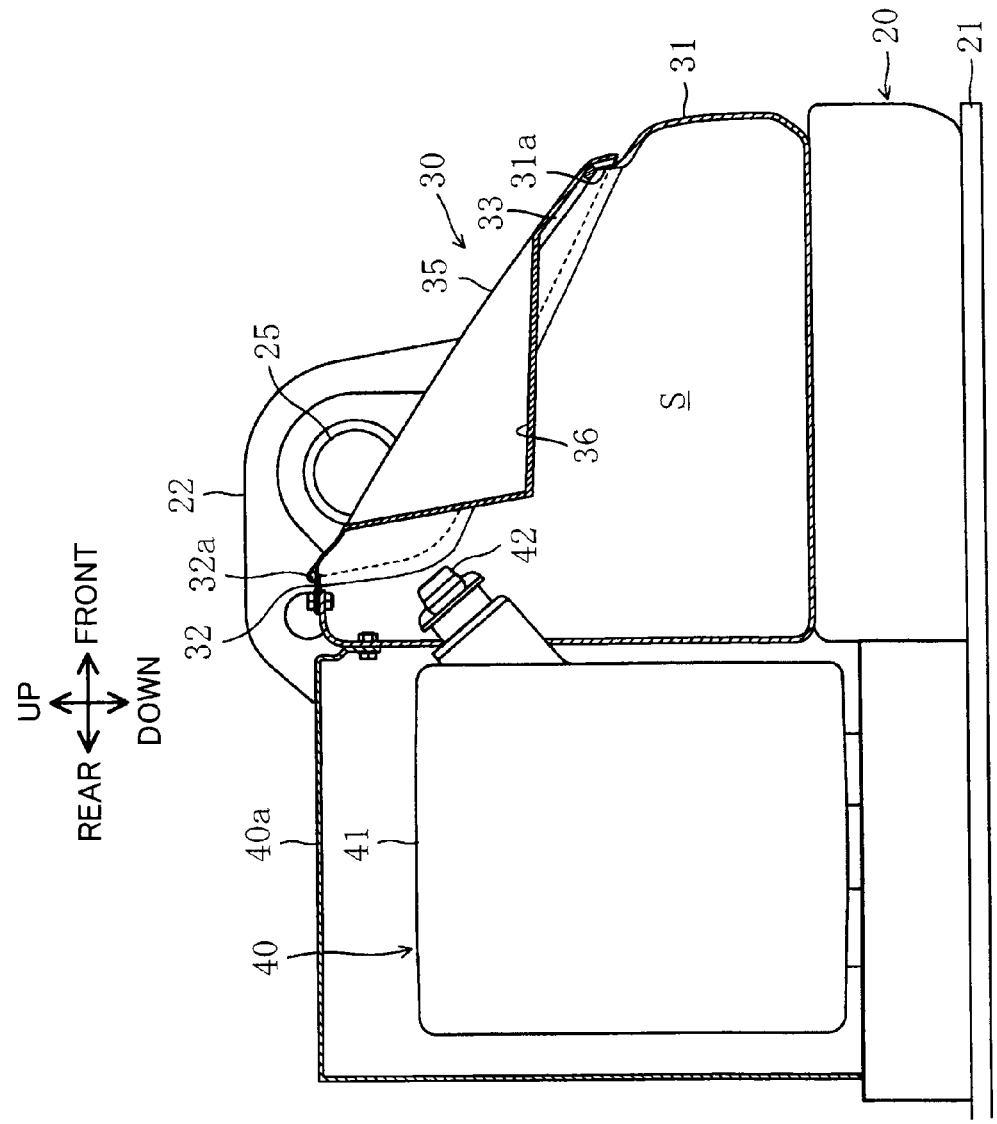
FIG. 3 is a sectional side view showing a state of the opening/closing cover closing the opening.
Figure 4:
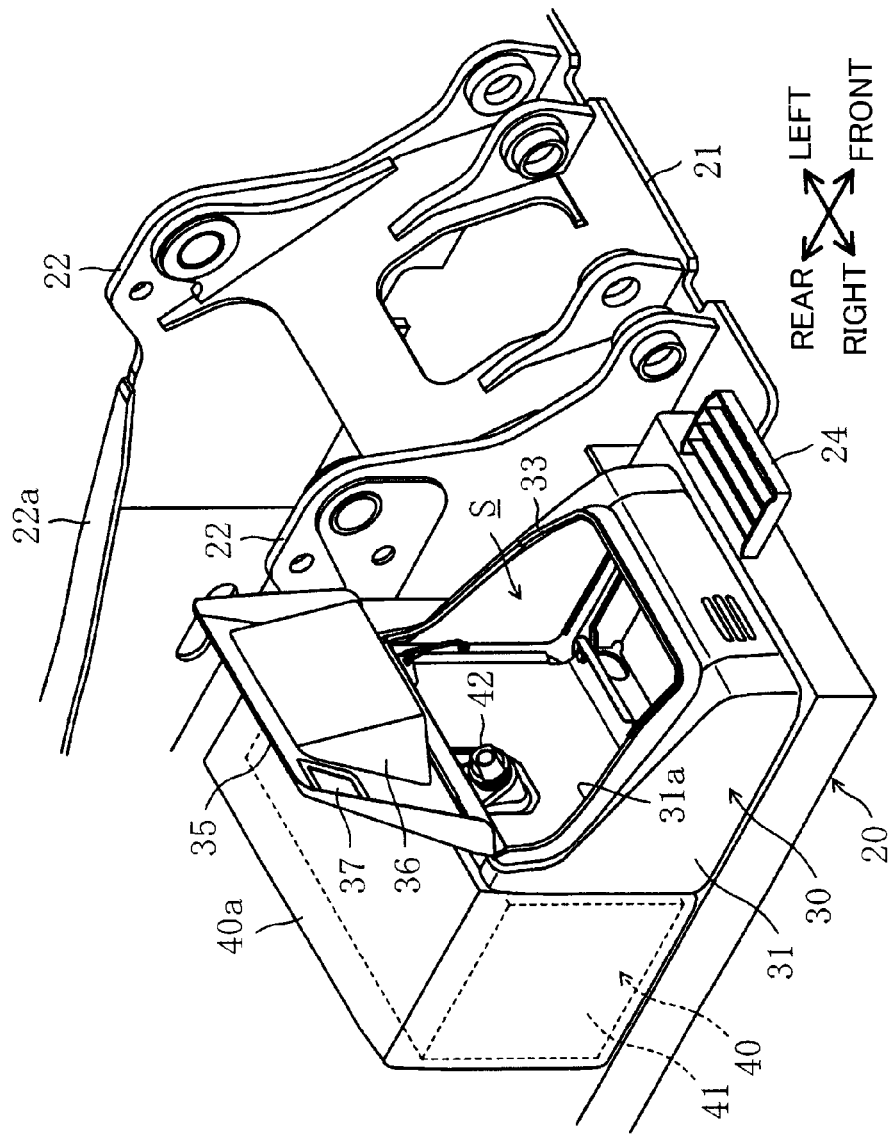
FIG. 4 is a perspective view showing a state of the opening/closing cover opening the opening.
Figure 5:
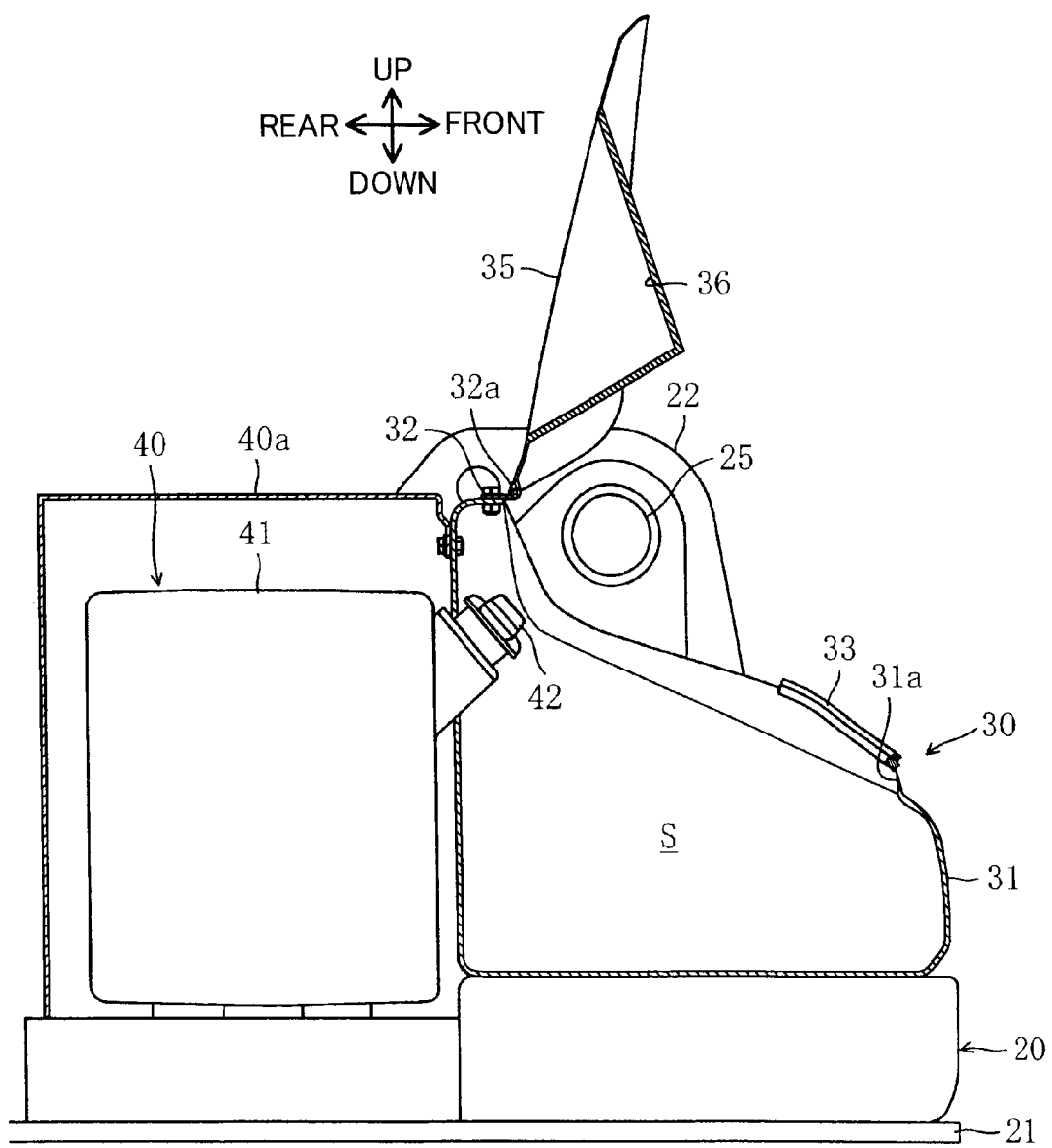
FIG. 5 is a sectional side view showing a state of the opening/closing cover opening the opening.

As viewed in side view, a part of the opening/closing cover 35 in the close position overlaps a part of the boom foot pin 25 as shown in FIG. 3, while the opening/closing cover 35 in the open position does not overlap the boom foot pin 25 as shown in FIG. 5. This arrangement reduces the burden of an operator during removal of the boom foot pin 25 for a maintenance operation. If a part of the opening/closing cover 35 always overlapped a part of the boom foot pin 25 in side view in each of the open and close positions, the operator could not pull out the boom foot pin 25 at a lateral side of the construction machine 10 due to interference of the boom foot pin 25 with the opening/closing cover 35. The pull-out operation, therefore, would require a temporal removal of the box body 31 and the opening/closing cover 35 of the tool box 30 from the upper frame 20, thus increasing the operator's burden. On contrary, the arrangement shown in FIG. 3 and FIG. 5 enables the operator to pull out the boom foot pin 25 to remove it at a lateral side of the construction machine 10 by merely opening the opening/closing cover 35, thereby reducing the operator's burden.

The box body 31 is attached with a seal member 33 made of an elastic material such as a resin material or a rubber material. The seal member 33 is fixed to the box body 31 in a portion thereof corresponding to a peripheral edge of a front part of the opening 31a, so as to make close contact with the opening/closing cover 35 in the close position while elastically deformed to thereby seal the gap between the box body 31 and the opening/closing cover 35.

The opening/closing cover 35 is formed with a step portion 36, which is formed by recessing a substantially middle part of the opening/closing cover 35a toward the accommodation space S, in other words, by protruding the middle part into the accommodation space S, the part being a substantially middle part of the opening/closing cover 35 in the close position with respect to a direction of inclination thereof. The step portion 36 includes a substantially horizontal step surface for permitting the operator to place his foot on the step surface continuously with the step on the platform 24 when the operator steps up and down the upper slewing body 12.

The opening/closing cover 35 is provided with a locking mechanism 37. The locking mechanism 37 is located, for instance, on the right side of the step portion 36 to allow the opening/closing cover 35 at the close position to be locked.

The construction machine 10 in the embodiment further includes an SCR system for reducing NOx contained in exhaust gas of the engine 65. The SCR system employs reducing agent, as which urea water is used. The urea water is an aqueous solution containing water and specific amount of water added to the water.

The SCR system includes a reducing-agent supply device 45 and a reducing-agent supply pipe 46 shown in FIG. 1, in addition to the reducing-agent tank 40. The reducing-agent supply pipe 46 is arranged to interconnect the reducing-agent tank 40 and the reducing-agent supply device 45. The reducing-agent supply device 45 ejects reducing agent supplied from the reducing-agent tank 40 through the reducing-agent supply pipe 46 into an exhaust channel defined in the exhaust pipe 67.

The reducing-agent tank 40 includes a tank body 41 for storing reducing agent and a supply nozzle 42 which is a supply portion for supply of reducing agent into the tank body 41. The tank body 41 is disposed outside the box body 31, specifically, at the rear side of the box body 31, while covered with a tank cover 40a. The supply nozzle 42 includes a basal end to be connected to the tank body 41 and a distal end opposite to the basal end, allowing reducing agent to be supplied in the tank body 41 through the supply nozzle 42. The supply nozzle 42 is disposed in an oblique posture with location of the distal end higher than the basal end, the basal end being connected to a front wall of the tank body 31, namely, a tank side wall adjacent to the rear wall of the box body 31. The position of the basal end of the supply nozzle 42, thus, corresponds to the upper limit of liquid level of reducing agent to be supplied in the tank body 41. This makes it possible to always retain an air layer in the tank body 41 regardless of supply of reducing agent into the tank body 41, in other words, to prevent the tank body 41 from full replenishment with reducing agent, thereby protecting the reducing-agent tank 40 from damage due to freeze of reducing agent in the reducing-agent tank 40.

The supply nozzle 42 passes through the rear wall of the box body 31, which is a box side wall of the box body 31 and which is adjacent to the front wall of the tank body 31, to thereby locate the distal end of the supply nozzle 42 in the accommodation space S. The distal end of the supply nozzle 42 is, more specifically, located at a position higher than the lower edge portion of the opening/closing cover 35 in the close position and closer to the upper edge portion than the lower edge portion. This position is, according to the embodiment, a position between the step portion 36 of the opening/closing cover 35 in the close position and the rear wall of the box body 31. This position of the distal end of the supply nozzle 42 makes the distal end visible to an operator through the opening 31a when the opening/closing cover 35 is in the open position. This enables the operator to access the supply nozzle 42 by merely moving the opening/closing cover 35 to the open position, thus facilitating respective operations of supply of reducing agent through the supply nozzle 42 and maintenance.

Besides, the location of the distal end of the supply nozzle 42 in the accommodation space S allows the supply operation to be made inside the accommodation space S of the tool box 30, thus eliminating the requirement of a work space to be secured around the supply nozzle 42 to thereby allow the entire construction machine to be small-sized. Furthermore, the location also enables the upper portion of the accommodation space S, which is, by nature, a dead space, to be effectively utilized as a space for installing the supply nozzle 42. Meanwhile, the supply nozzle 42 is prevented from impact with the tool.

The aforementioned embodiment may be modified in various ways. Some modifications are described in the following. The same elements in the modifications as those in the embodiment are indicated with the same reference numerals, and repeated description thereof is omitted. In other words, the following description is made only about respective differences between the embodiment and the modifications.

Figure 6:
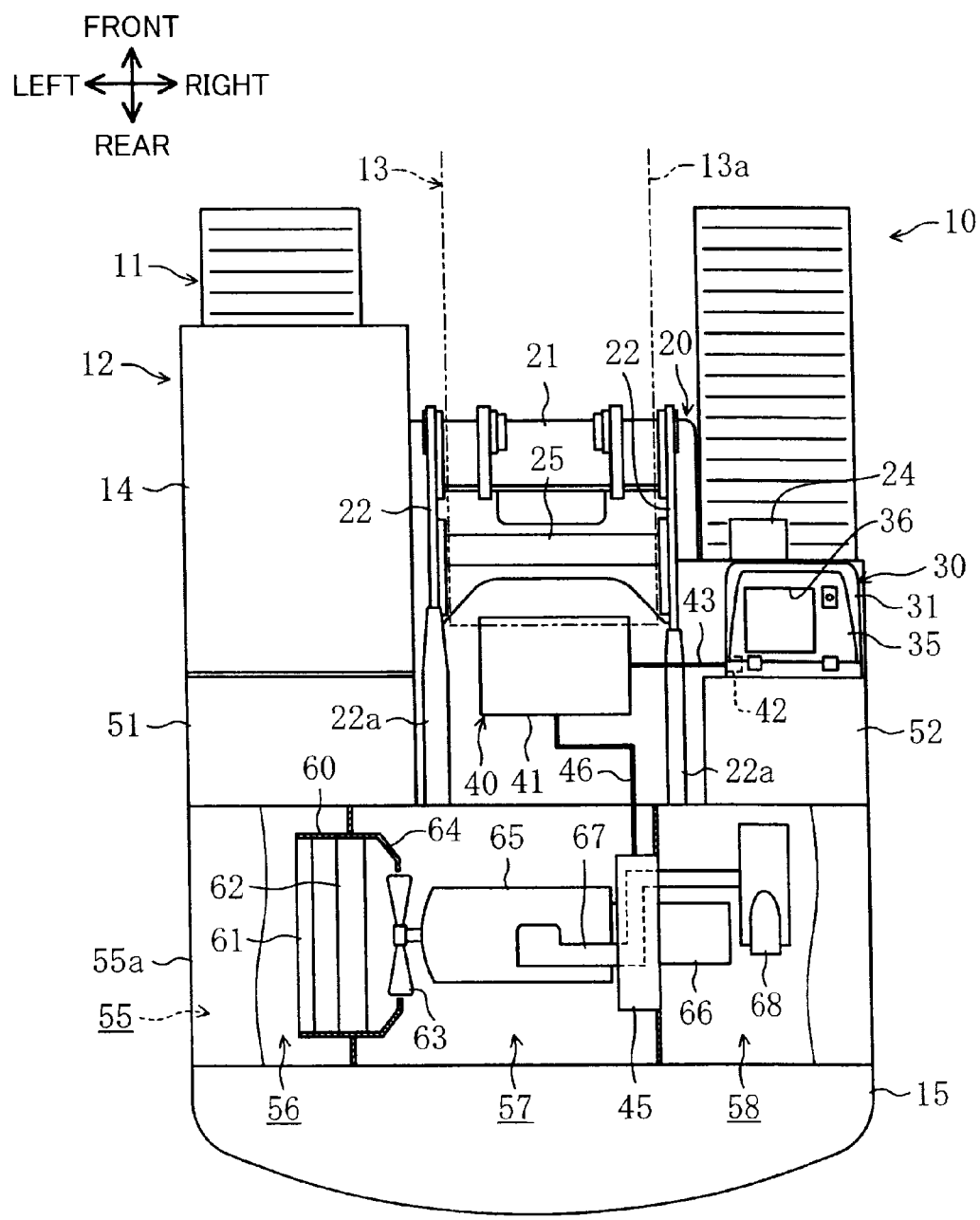
FIG. 6 is a plan view of a construction machine according to a first modification of the embodiment.

FIG. 6 is a plan view showing a construction machine according to a first modification. The construction machine also includes a reducing-agent tank 40, which has a tank body 41 and a supply nozzle 42 having a basal end and a distal end opposite to the basal end; however, the tank body 41 is disposed between a pair of right and left vertical plates 22 and the supply nozzle 42 passes through a left wall of a box body 31 of a tool box 30 to locate the distal end of the supply nozzle 42 in an accommodation space S defined in the box body 31. The reducing-agent tank 40 further includes a supply pipe 43 interconnecting the tank body 41 and the supply nozzle 42.

The disposition of the tank body 41 between the paired right and left vertical plates 22 enables the dead space to be effectively utilized. The disposition also eliminates the need for disposing the reducing-agent tank 40 between the tool box 30 and a hydraulic-fluid tank 52, thereby allowing the entire construction machine to be small-sized.

In the first modification, it is permitted to change the part of the box body 31, in which part the supply nozzle 42 passes through the box body, from the left wall of the box body 31 shown in FIG. 6 to the rear wall of the box body 31 like the above embodiment.

Figure 7:
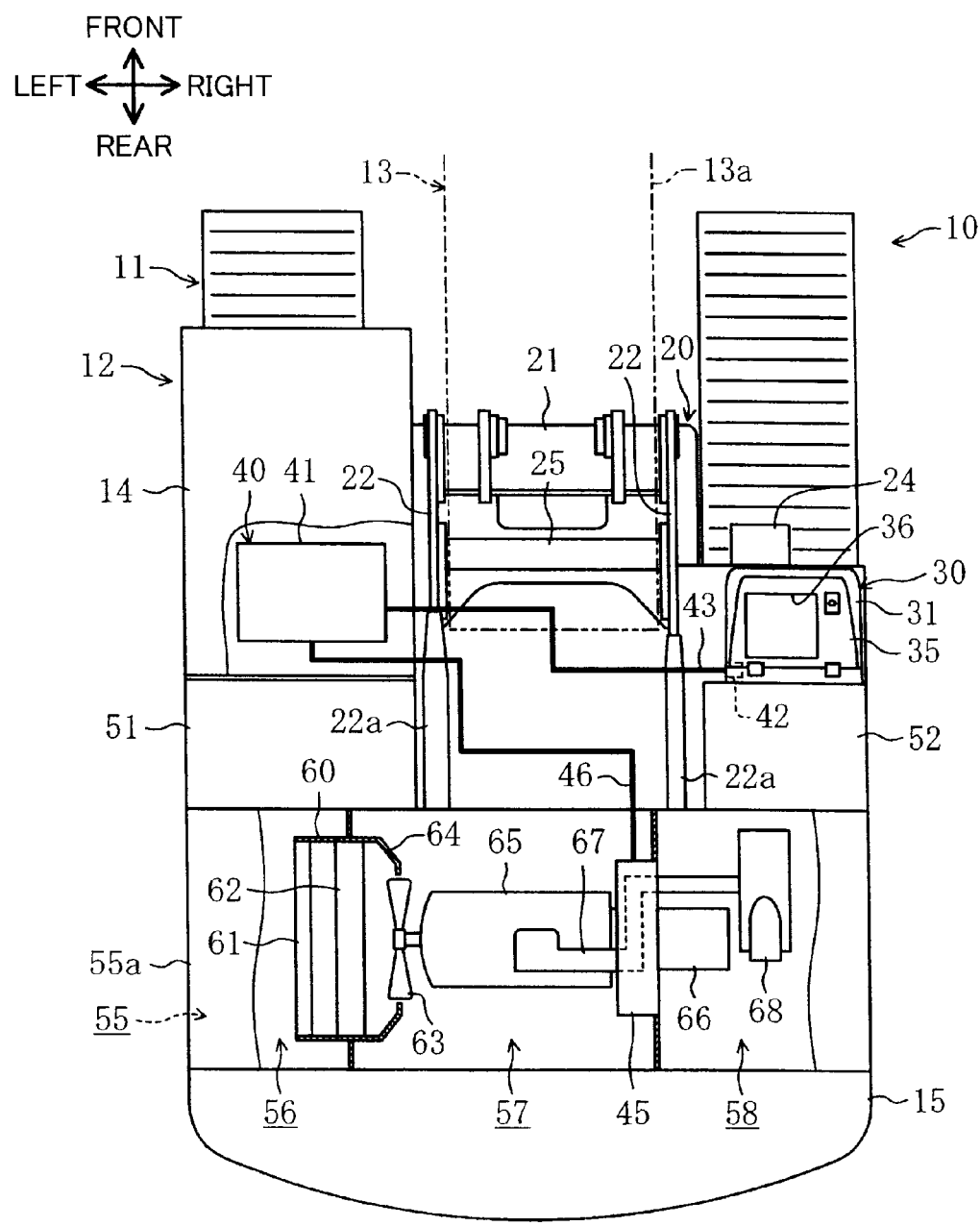
FIG. 7 is a plan view of a construction machine according to a second modification of the embodiment.

FIG. 7 is a plan view showing a construction machine according to a second modification. The construction machine according to the second modification also includes a reducing-agent tank 40, which includes a tank body 41 and a supply nozzle 42, the supply nozzle 42 having a basal end and a distal end opposite to the basal end; however, the tank body 41 is disposed under the floor of a cab 14 and the supply nozzle 42 passes through a left wall of a box body 31 of a tool box 30 to locate the distal end of the supply nozzle 42 in an accommodation space S defined in the box body 31. The reducing-agent tank 40 further includes a supply pipe 43 interconnecting the tank body 41 and the supply nozzle 42.

The disposition of the tank body 41 under the floor of the cab 14 enables the dead space to be effectively utilized. The disposition also eliminates the need for disposing the reducing-agent tank 40 between the tool box 30 and a hydraulic-fluid tank 52, thereby allowing the entire construction machine to be small-sized.

Also in the second modification, it is permitted to change the part of the box body 31 in which part the supply nozzle 42 passes through the box body 31 from the left wall of the box body 31 shown in FIG. 7 to the rear wall of the box body 31 like the above embodiment.

The embodiment may be further modified in various ways other than the above.

For instance, the tool box and the reducing-agent tank in the invention are not limited to the tool box 30 and the reducing agent 40 which are disposed independently of each other. For instance, there may be a single box body which constitutes both of a tool box and a tank accommodation section. Specifically, it is also possible to dispose a partition wall in an inner space surrounded by the box body to partition the inner space into a tool accommodation space serving as the tool box and a tank accommodation space for accommodating a tank body of the reducing-agent tank while joining a basal end of a supply portion of the reducing-agent tank to the tank body inside the tank accommodation space and making the supply portion pass through the partition wall to locate the distal end of the supply portion in the tool accommodation space.

As described above, provided is a construction machine including a reducing-agent tank, the construction machine allowing an operator to supply reducing agent into the reducing-agent tank easily, while securing a sufficient space for accommodating a tool. The provided construction machine includes: an engine; a reducing-agent tank having a tank body for storing reducing agent to reduce exhaust gas from the engine and a supply portion which is connected to the tank body to allow the reducing agent to be supplied in the tank body through the supply portion; and a tool box for accommodating a tool. The tool box includes a box body internally defining an accommodation space having an opening which allows the accommodation space to be opened outwards of the box body and allows the tool to be put into and taken from the accommodation space through the opening, and an opening/closing cover which opens and closes the opening. The tank body is disposed outside the box body. The supply portion includes a basal end connected to the tank body and a distal end opposite to the basal end, the distal end located at a position in the accommodation space, the position making the distal end visible from the outside of the box body through the opening which is opened.

The construction machine, in which the distal end of the supply portion of the reducing-agent tank is located in the accommodation space so as to be visible through the opening which is opened and closed by the opening/closing cover, allows an operator to access the distal end of the supply portion by merely opening the opening/closing cover to easily perform an operation for supply of reducing agent or maintenance. Besides, the operator is allowed to perform a supply operation in the accommodation space of the tool box, which eliminates the need for specially securing a work space around the distal end of the supply portion to thereby allow the entire construction machine to be small-sized. Furthermore, disposition of the tank body of the reducing-agent tank outside the tool box allows the tool box to have a sufficiently secured accommodation space and eliminates a possibility that the tool in the tool box exerts an impact on the tank body to bring the tank body into damage. Besides, the opening/closing cover for opening and closing the opening can be utilized as a protection cover for the distal end of the supply portion, thereby allowing reductions in the number of parts and the cost to be established. Moreover, the opening/closing cover, if having a locking mechanism capable of locking the opening/closing cover, allows both of the tool and the reducing agent to be prevented from being stolen by the common locking mechanism.

It is preferable: the opening is formed so as to open the accommodation space obliquely upward; the opening/closing cover includes an upper edge portion and a lower edge portion opposite to the upper edge portion and is connected to the box body so as to be capable of pivotal movement about a pivot axis extending along the upper edge portion, the pivotal movement allowing the opening/closing cover to be moved between a close position in which the opening/closing cover closes the opening in an oblique posture locating the upper edge portion on an upper side and an open position in which the lower edge portion is apart from the box body upward to open the opening; and the distal end of the supply portion is disposed at a position higher than the lower edge portion of the opening/closing cover in the close position and closer to the upper edge portion than the lower edge portion.

The opening/closing cover thus connected to the box body can open and close the opening only by its simple pivotal movement with neither attachment nor detachment of the opening/closing cover. Furthermore, the space corresponding to the upper portion of the accommodation space, though being a dead space by nature, is allowed to be effectively utilized as a space for disposing the distal end of the supply portion. Besides, the thus disposed distal end of the supply portion can avoid impact with the tool in the tool box.

Moreover, in the case where a part of the opening/closing cover is recessed toward the accommodation space to form a step portion, it is preferable that the distal end of the supply portion is located between the step portion of the opening/closing cover in the close position and a side wall of the box body. This disposition promotes the effective utilization of the dead space.

The box body preferably includes a box side wall adjacent to the tank body, and the supply portion passes through the box side wall to locate the distal end of the supply portion in the accommodation space. This disposition makes it possible to locate the distal end of the supply portion in the accommodation space while connecting the basal end of the supply portion to the tank body.

In the above configuration, more preferable is that the tank body includes a tank side wall adjacent to the box side wall and the basal end of the supply portion is directly connected to the tank side wall. This arrangement eliminates the need for a pipe interconnecting the supply portion and the tank body.

The construction machine may further includes an upper slewing body, on which the reducing-agent tank and the tool box are loaded on.

In addition, in the case where the upper slewing body includes a bottom plate and a pair of right and left vertical plates standing upright on the bottom plate and extending in front and rear directions of the bottom plate, the tank body may be disposed between the pair of right and left vertical plates on the bottom plate. In this configuration, preferable is that the reducing-agent tank further includes a supply pipe interconnecting the tank body and the supply portion. This arrangement, enabling the tank body disposed in a space between the paired right and left vertical plates, makes it possible to effectively utilize a dead space, thus allowing the entire construction machine to be small-sized.

In the case of the construction machine further including a cab defining an operation space for an operator and being loaded on the upper slewing body, the tank body may be disposed under a floor of the cab. In this configuration, preferable is that the reducing-agent tank further includes a supply pipe interconnecting the tank body and the supply portion. This arrangement, enabling the tank to be disposed under the floor of the cab, makes it possible to effectively utilize the dead space, thus allowing the entire construction machine to be small-sized.

This application is based on Japanese Patent Application No. 2014-006499 filed on Jan. 17, 2014, the contents of which are hereby incorporated by reference.

Although the present invention has been fully described by way of example with reference to the accompanying drawings, it is to be understood that various changes and modifications will be apparent to those skilled in the art. Therefore, unless otherwise such changes and modifications depart from the scope of the present invention hereinafter defined, they should be construed as being included therein.

What is claimed is:
1. A construction machine, comprising:
an engine;
a reducing-agent tank including a tank body which stores reducing agent for reducing exhaust gas of the engine, and a supply portion which is connected to the tank body to allow the reducing agent to be supplied into the tank body through the supply portion; and
a tool box for accommodating a tool, the tool box including a box body internally defining an accommodation space having an opening which allows the accommodation space to be opened outwards of the box body and which allows the tool to be put into and taken from the accom- modation space through the opening, and an opening/closing cover which opens and closes the opening, wherein:

the tank body is disposed outside the box body; and the supply portion includes a basal end connected to the tank body and a distal end opposite to the basal end, the distal end of the supply portion being located at a position in the accommodation space, the position making the distal end visible from the outside of the box body through the opening which is opened.

2. The construction machine according to claim 1, wherein:

the opening is formed so as to open the accommodation space obliquely upward;

the opening/closing cover includes an upper edge portion and a lower edge portion opposite to the upper edge portion; the opening/closing cover is connected to the box body so as to be capable of pivotal movement about a pivot axis extending along the upper edge portion, the pivotal movement allowing the opening/closing cover to be moved between a close position in which the opening/closing cover opens the opening in an oblique posture locating the upper edge portion on an upper side and an open position in which the lower edge portion is apart from the box body upward to open the opening; and the distal end of the supply portion is disposed at a position higher than the lower edge portion of the opening/closing cover in the close position and closer to the upper edge portion than the lower edge portion.

3. The construction machine according to claim 2, wherein a part of the opening/closing cover is recessed toward the accommodation space to form a step portion, and the distal end of the supply portion is located between the step portion of the opening/closing cover in the close position and a side wall of the box body.

4. The construction machine according to claim 1, wherein the box body includes a box side wall adjacent to the tank body, and the supply portion passes through the box side wall to locate the distal end of the supply portion in the accommodation space.

5. The construction machine according to claim 4, wherein the tank body includes a tank side wall adjacent to the box side wall, and the basal end of the supply portion is directly connected to the tank side wall.

6. The construction machine according to claim 1, further comprising an upper clewing body, on which the reducing-agent tank and the tool box are loaded.

7. The construction machine according to claim 6, wherein:

the upper slewing body includes a bottom plate and a pair of right and left vertical plates standing upright on the bottom plate and extending in front and rear directions of the bottom plate; the tank body is disposed between the pair of right and left vertical plates on the bottom plate; and the reducing-agent tank further includes a supply pipe interconnecting the tank body and the supply portion.

8. The construction machine according to claim 6, further comprising a cab defining an operation space for an operator and being loaded on the upper slewing body;

the tank body is disposed under a floor of the cab; and the reducing-agent tank further includes a supply pipe interconnecting the tank body and the supply portion.

9. A construction machine, comprising:

a lower travelling body;

an upper slewing body mounted to the lower travelling body;

an operator cab provided to the upper slewing body;

a counterweight provided to the upper slewing body;

an engine provided to the upper slewing body;

a fluid tank provided to the upper slewing body, the fluid tank including a tank body, the fluid tank further comprising a tubular supply portion having a basal end connected to the tank body, the tubular supply portion further having a distal end opposite the basal end, whereby a fluid may be supplied into the tank body through the distal end of the supply portion; and a tool box provided to the upper slewing body for accommodating a tool, the tool box including a box body internally defining an accommodation space, the box body having an opening which allows the accommodation space to accessed from a location outside of the box body and which allows the tool to be put into and taken from the accommodation space through the opening, the box body yet further having a cover mounted to open and close the opening, wherein:

the tank body is disposed outside the box body and the accommodation space; and the distal end of the supply portion is located at a position in the accommodation space, the position of the distal end in the accommodation space making the distal end visible from the outside of the box body when the cover has opened the opening.

* * * * *